United States Patent [19]
Andrews et al.

[11] Patent Number: 6,115,222
[45] Date of Patent: *Sep. 5, 2000

[54] SINGLE, CENTRAL LIMIT STOP FOR A DISC DRIVE ACTUATOR

[75] Inventors: Michael Kenneth Andrews, Santa Cruz; Frederick Frank Kazmierczak, San Jose, both of Calif.

[73] Assignee: Seagate Technology, Inc., Scotts Valley, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/118,356

[22] Filed: Jul. 17, 1998

Related U.S. Application Data

[63] Continuation of application No. 08/852,448, May 6, 1997, Pat. No. 5,875,073.

[51] Int. Cl.[7] ................................................. G11B 21/02
[52] U.S. Cl. ........................................................ 360/265.1
[58] Field of Search ............................. 360/97.01, 105, 360/106, 265.1, 265.8

[56] References Cited

U.S. PATENT DOCUMENTS 5,402,290  3/1995  Daniel ..................................... 360/106

FOREIGN PATENT DOCUMENTS

| 1-208771 | 8/1989 | Japan . |
|---|---|---|
| 3-165377 | 7/1991 | Japan . |
| 3-252972 | 11/1991 | Japan . |
| 4-67366 | 3/1992 | Japan . |
| 4-302874 | 10/1992 | Japan . |

*Primary Examiner*—William Klimowicz
*Attorney, Agent, or Firm*—Edward P. Heller, III; Richard H. Stern

[57] ABSTRACT

An improved limit stop system for defining the extremes of the range of motion of the actuator of a disc drive. An elongated slot having inner and outer contact surfaces is provided in the bobbin inside the coil of the actuator voice coil motor. A pin member having a compliant portion is assembled through the elongated slot in the coil bobbin and into engagement with stationary components of the disc drive. When the intended extreme of the range of motion of the actuator is reached, either the inner or outer contact surface of the elongated slot contacts the compliant portion of the pin member preventing further motion of the actuator in that direction.

3 Claims, 5 Drawing Sheets

SINGLE, CENTRAL LIMIT STOP FOR A DISC DRIVE ACTUATOR

This application is a continuation of Ser. No. 08/852,448, filed on May 6, 1997, now U.S. Pat. No. 5,875,073.

BACKGROUND OF THE INVENTION

This invention relates generally to the field of disc drive data storage devices, and more particularly, but not by way of limitation, to an improved limit stop system for defining the maximum range of motion of the actuator of a disc drive.

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As is well known in the industry, when power to the disc drive is lost, a voice coil actuator, such as that just described, includes no elements to maintain control of the relative position of the coil to the permanent magnets, and thus the position of the heads relative to the discs. For this reason, it is common practice in the industry to move the heads to a park position, or landing zone, and to latch the actuator there until power is restored to the disc drive.

It is also common practice in the industry to incorporate a system of limit stops in the disc drive to define the maximum range of motion of the actuator. Such limit stops are necessary to prevent damage to the heads, flexures or discs should the actuator attempt to move the heads into an unintended relationship with the discs due to either a loss of disc drive power or a failure in the logic controlling the actuator position.

Historically, the limit stops in a disc drive have included some sort of mechanism which provides for a selected amount of compliance when the limit stops are encountered. Such compliance is necessary to prevent damage to the delicate mechanical components of the flexures used to mount and support the heads which could be brought about by abrupt deceleration of the actuator. Various mechanisms for providing this selected compliance have been used, including springs, elastomers, dash pots and moving mass.

It has also been common practice to provide features, such as tabs or pins, on the moving portion of the actuator, and to provide separate inner and outer limit stop mechanisms against which the features of the moving portion of the actuator are brought into contact. Another typical practice is to incorporate the latching mechanism used to hold the actuator in the park position into the mechanism of the inner limit stop.

One major drawback of such separate inner and outer limit stops lies simply in the number of components that must be incorporated in the disc drive, increasing the cost of the disc drive.

Secondly, having separate inner and outer limit stops also requires that precise location mechanisms for both of these components must be provided. Indeed, in some prior art limit stop systems, both position of both the inner and outer limit stops is an adjustment that must be manually performed during the manufacturing process, again contributing to both the complexity and cost of the disc drive.

A need clearly exists, therefore, for an improved limit stop system for the actuator in a disc drive that minimizes parts count and assembly steps while still providing precise location of the extremes of the range of motion of the actuator and necessary limit stop compliance.

SUMMARY OF THE INVENTION

The present invention is an improved limit stop system for the actuator in a disc drive which includes an elongated slot in the bobbin used to support the coil of the voice coil motor. A pin member, including a compliant member, is mounted through the elongated slot in the coil bobbin and through appropriately dimensioned clearance features in the lower pole piece and the permanent magnet of the voice coil motor and into the disc drive housing base member. The limit stop function is provided when either of the ends of the elongated slot contact the compliant member on the pin member. The location of the pin member relative to the permanent magnets is selected to lie in the transition zone of the permanent magnets and thus have a minimal impact on the performance of the voice coil motor.

It is an object of the invention to provide a limit stop system for defining the extremes of the range of motion of the moving portion of a disc drive actuator.

It is another object of the invention to provide a limit stop system for the actuator of a disc drive that minimizes the number of parts required.

It is another object of the invention to provide a limit stop system for the actuator of a disc drive that requires minimal assembly time and effort.

It is another object of the invention to provide a limit stop system for the actuator of a disc drive that can be implemented at minimal cost.

These objects, along with other features and benefits of the invention, can best be understood by a review of the following DETAILED DESCRIPTION OF THE INVENTION when read in conjunction with a study of the accompanying drawings.

DETAILED DESCRIPTION OF THE INVENTION

Figure 1:
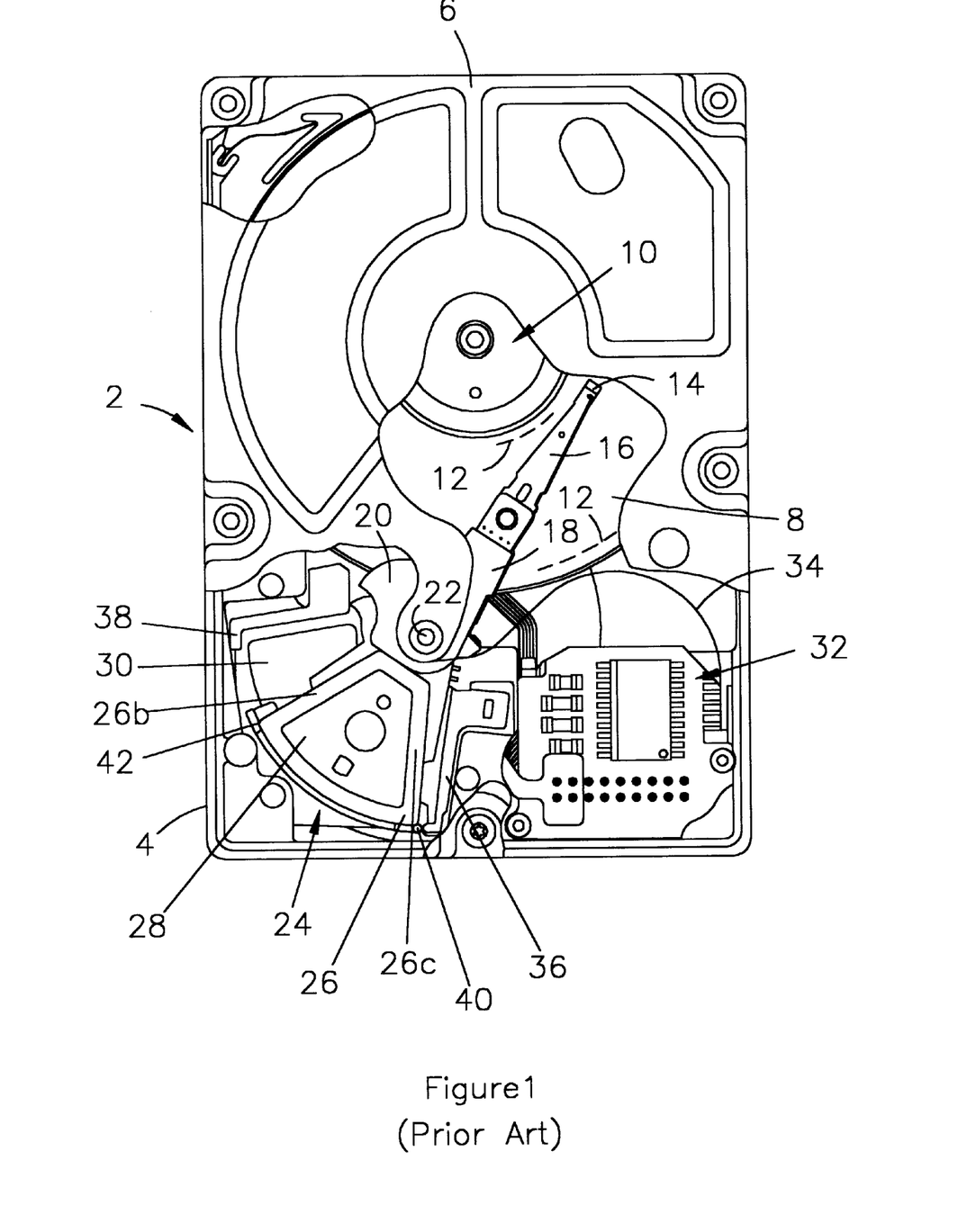
FIG. 1 is a top plan view of a prior art disc drive in which the present invention is particularly useful.

Turning now to the drawings and specifically to FIG. 1, shown is a typical disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing enclosing delicate internal components and isolating these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil 26 formed around a bobbin 28 and supported by the actuator bearing housing 20 within the magnetic field of an array of permanent magnets, one of which is shown at 30, which are fixedly mounted to the base member 4, all in a manner well known in the industry. Electronic circuitry (partially shown at 32, generally, and partially carried on a printed circuit board (not shown)) to control all aspects of the operation of the disc drive 2 is provided, with control signals to drive the VCM 24 as well as data signals to and from the heads 14, carried between the electronic circuitry and the moving actuator assembly via a flexible printed circuit cable (PCC) 34.

The disc drive 2 also includes a prior art limit stop system consisting of an inner limit stop/latch 36, an outer limit stop 38 and, integrally molded onto the coil 26, inner and outer contact features 40, 42, respectively. The figure shows the actuator at its innermost position relative to the discs 8, with the inner limit stop/latch 36 contacting the inner contact feature 40. It will be apparent to one of skill in the art that, if the actuator were to be rotated about the pivot shaft 22 to its outermost position, with the heads 14 closely adjacent the outer diameter of the discs 8, the outer contact feature 42 would contact the outer limit stop 38. Thus the extremes of the range of motion of the actuator of the disc drive 2 are defined by the inner and outer limit stops 36, 38 in cooperation with the inner and outer contact features 40, 42 carried by the movable coil 26. Additional details of this prior art limit stop/latch system, including the manner in which compliance in the limit stops is achieved, can be found in U.S. Pat. No. 5,266912, issued Nov. 16, 1993, assigned to the assignee of the present application and incorporated herein by reference.

Figure 2:
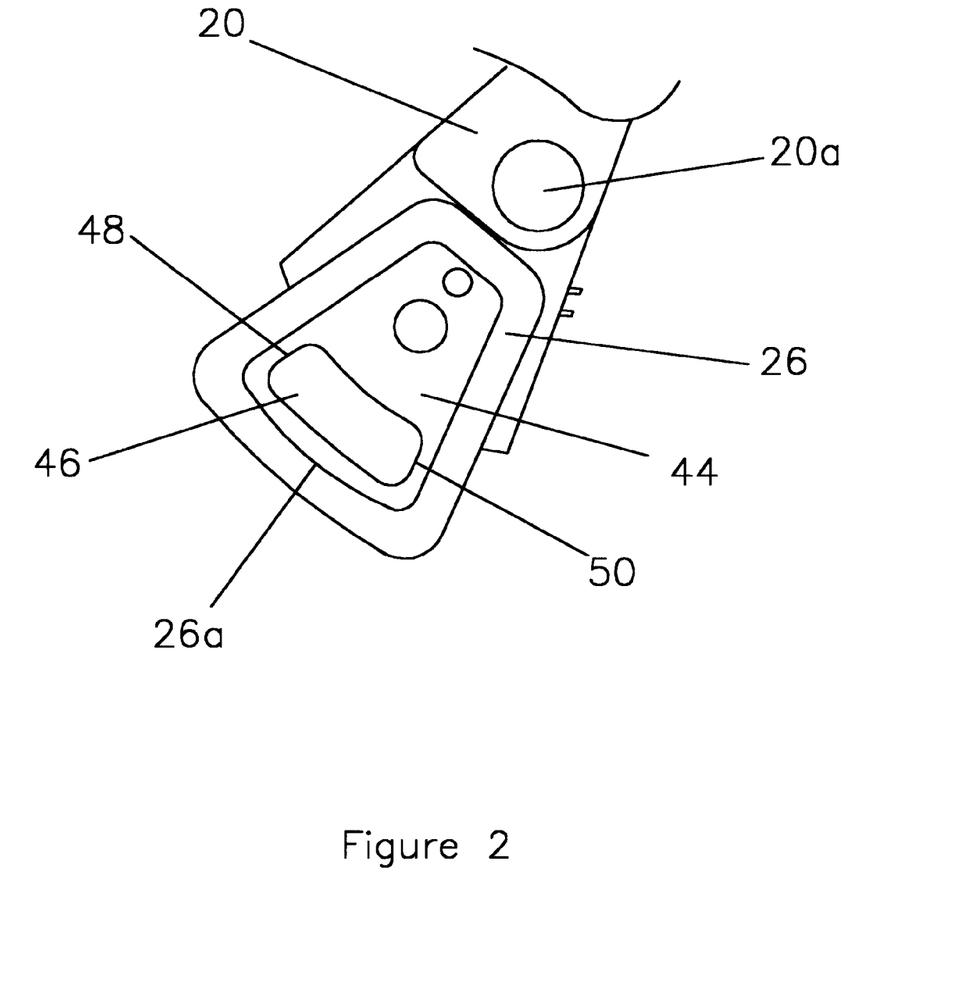
FIG. 2 is a plan view of a portion of the moving portion of a disc drive actuator that has been modified in accordance with the present invention.

Turning now to FIG. 2, shown is a plan view of a part of the moving portion of a disc drive actuator mechanism which has been modified in accordance with the present invention. The figure shows an actuator bearing housing 20 similar to that of FIG. 1. The actuator bearing housing 20 includes a hole 20a adapted to receive the bearings (not shown) which mount the moving portion of the actuator to the pivot shaft (22 in FIG. 1). Also shown is a coil 26, also similar to that of FIG. 1. The coil 26 is integrally formed about a bobbin 44 in a manner well known in the industry. The bobbin is typically molded plastic.

The bobbin 44 of FIG. 2 differs from the bobbin 28 of FIG. 1 by the inclusion of an elongated slot 46 lying close to and extending parallel with the outer end portion 26a of the coil 26. The elongated slot includes inner and outer contact surfaces 48, 50 which interact with other components of the inventive limit stop system in a manner to be described below.

As will be apparent to one of skill in the art, the inclusion of the elongated slot 46 in the bobbin 44 can be achieved by adapting the mold used to form the bobbin 44, and, as such, involves no additional manufacturing or parts cost over those of the prior art bobbin 28 of FIG. 1.

Figure 3:
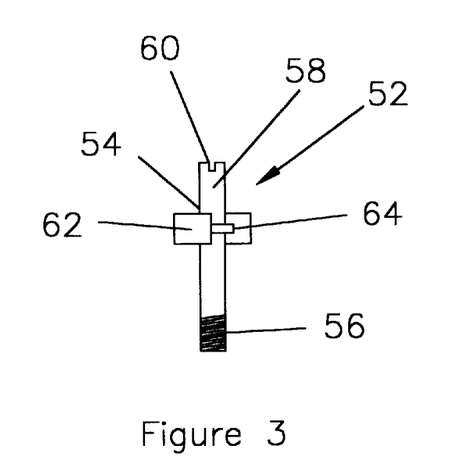
FIG. 3 is a partially sectioned elevation view of a first embodiment of a pin member which forms a part of the present invention.

FIG. 3 is a partially sectioned elevation view of a first embodiment of a pin member 52 which forms a part of the present invention. As can be seen in the figure, the pin member 52 consists of a metal core portion 54, which includes a threaded mounting end 56, and a shaft end 58. The shaft end 58 includes a tooling feature 60 which allows the pin member 52 to be assembled into the disc drive. While the tooling feature 60 is shown as a simple slot appropriate for use with a flat blade screw driver, the person of skill in the art will realize that the specific form of the tooling feature 60 and the tool used in conjunction with the tooling feature 60 for assembly are readily selectable from a variety of combinations, and, as such, should not be considered to be limiting to the scope of the invention. The threaded mounting end 56 and shaft end 58 of the pin member 52 are intended for engagement with other components of the invention, as will be discussed below.

The pin member 52 of FIG. 3 also includes an elastomeric member 62 surrounding the core portion 54. In the figure, the elastomeric member 62 is shown in elevation on the left of the drawing and in section on the right of the drawing. As can be seen in the sectional right portion of the figure, the core portion 54 includes a feature 64 which engages the elastomeric member 62 and prevents axial shifting of the elastomeric member 62 relative to the core portion 54.

In the embodiment shown in the figure, it is envisioned that the elastomeric member will be overmolded on the core portion 54 using processes well known in the art. The selection of the material of the elastomeric member 62 as well as its dimensions will be determined by the relationship between the pin member 52 and other components of the invention as will be discussed below, and this material and dimension selection will determine the compliance of the limit stop system, as will also be discussed below.

Figure 4:
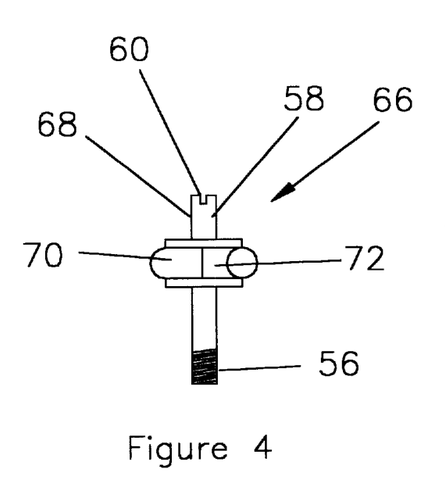
FIG. 4 is a partially sectioned elevation view of a second embodiment of a pin member which forms a part of the present invention.

FIG. 4 shows an alternative embodiment of a pin member 66 which includes a core portion 68 with a threaded mounting end 56 and shaft end 58 with tooling feature 60 similar to those elements shown in FIG. 3. Pin member 66 also includes an elastomeric member 70 shown in elevation on the left of the drawing and in section on the right of the drawing. As can be seen, it is envisioned that the elastomeric member 70 is in the form of a toroidal O-ring which is engaged with an annular groove 72 formed in the core portion 68 of the pin member 66. The location, material and dimensions of the elastomeric member 70 will be determined by the relationship to other components of the limit stop system as will be discussed in more detail below, and, as mentioned in relationship to the elastomeric member 62 of FIG. 3, the material and dimensions of the elastomeric member 70 will determine the compliance of the limit stop system as will also be discussed below.

Figure 5:
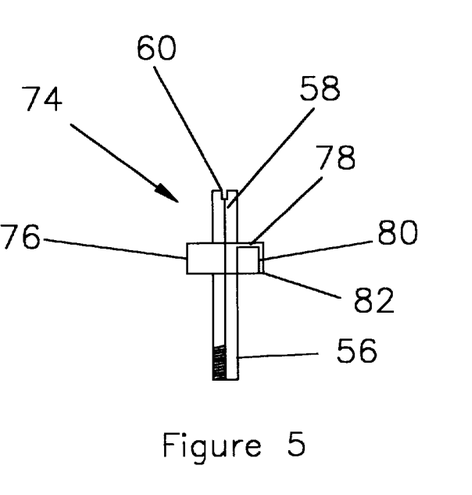
FIG. 5 is a partially sectioned elevation view of a third embodiment of a pin member which forms a part of the present invention.

FIG. 5 shows a second alternative embodiment of a pin member 74, with the pin member 74 shown in elevation on the left of the drawing and in section on the right of the drawing. The pin member 74 of FIG. 5 is envisioned to be formed from a single piece of material, and includes a threaded mounting end 56, a shaft end 58 and tooling feature 60 as described in relationship to FIG. 3 above.

The pin member 74 includes a compliant portion 76, which consists of a radially extending web member 78 and a cylindrical portion 80 which is coaxial with the central body (not designated) of the pin member 74. The resilience of the compliant portion 76 results from the fact that the cylindrical portion 80 is connected to the web member 78 at one end and open at its distal end 82. If contact is made between the pin member 74 and another component in a direction normal to the central axis of the pin member 74 and at a location near the distal end 82 of the cylindrical portion 80, the cylindrical portion 80 will be deformed and then return to its original shape. The amount of compliance provided is dependent on the material of the pin member, the dimensions of the web member 78 and cylindrical portion 80 and the point of contact along the axial length of the cylindrical portion 80, as will be appreciated by one of skill in the art. A limit stop system including a component having similar configuration is disclosed in U.S. Pat. No. 5,402,290, issued Mar. 28, 1995, assigned to the assignee of the present invention and incorporated herein by reference.

An examination of FIGS. 3, 4 and 5 together will reveal that all three pin members 52, 66, 74 share several general characteristics: 1) they each have a central shaft portion including a threaded mounting end and a shaft end; 2) they each have a to compliant portion surrounding the central shaft portion and axially symmetrical to the central shaft portion; and 3) the compliant portion of each is located axially between the two ends of the central shaft portion. While three specific embodiments of pin members are shown in the figures and described, the scope of the present invention is envisioned to be wide enough to include all possible embodiments of pin members that satisfy these general characteristics, as well as other particulars and variations that will be noted below.

Figure 6:
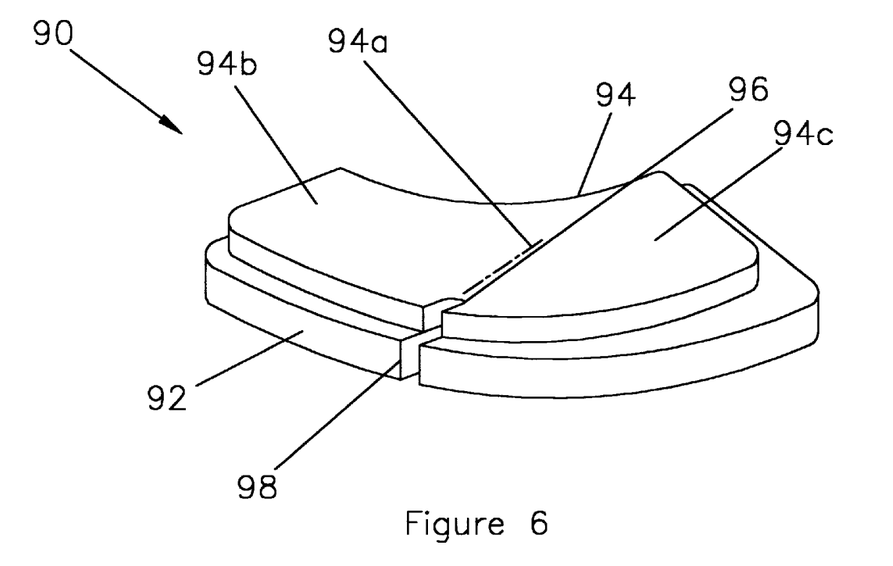
FIG. 6 is a perspective view of a permanent magnet and pole piece assembly for the voice coil motor of a disc drive actuator which has been modified in accordance with the present invention.

FIG. 6 shows a pole piece/permanent magnet assembly 90 for a VCM which has been modified in accordance with the present invention. The pole piece/permanent magnet assembly 90 consists of a steel pole piece 92 and a permanent magnet 94. The pole piece 92 provides a mechanical support for the permanent magnet 94, as well as a magnetic flux path, as is well known in the industry.

The permanent magnet 94 is divided along transition zone 94a into two magnet halves 94b, 94c, and the two magnet halves 94b, 94c are polarized in opposite directions. That is, the left magnet half 94b can be magnetized north-to-south in, for instance, a top to bottom direction, while the right magnet half 94c is magnetized north-to-south in a bottom to top direction, or vice versa. Each of the magnet halves 94b, 94c are intended to interact with a separate portion of the coil of the voice coil motor. Returning momentarily to FIG. 1, it will be noted that the coil 26 includes two radially extending arms 26b, 26c. During operation of the VCM, the range of travel of the coil 26 is established such that coil arm 26b swings only over one of the magnet halves, while coil arm 26c moves only over the other magnet half.

Turning back now to FIG. 6, it will be apparent that neither of the radially extending coil arms (26b, 26c in FIG. 1) will ever come into vertical alignment with the transition zone 94a of the permanent magnet 94.

The figure also shows a notch 96 in the permanent magnet 94 in the area of the transition zone 94a, and a similar notch 98 in the pole piece 92 aligned with the notch 96 in the permanent magnet 94. The notches 96, 98 are provided as clearance for the mounting of the pin member (52 in FIG. 3, 66 in FIG. 4, 74 in FIG. 5). A tapped hole is provided in the disc drive housing base member into which the threaded end of the pin member is screwed. When the pin member is assembled into the tapped hole in the base member, the compliant portion (62, 70, 76 in FIGS. 3, 4 and 5, respectively) of the pin member extends radially just above the top surface of the permanent magnet 94. This vertical space is the same as that occupied by the coil (26 in FIG. 1) when the VCM components are assembled into their intended relationship within the disc drive. This further means that the inner and outer contact surfaces (48, 50 in FIG. 2) of the modified bobbin of the present invention will also be in vertical alignment with the compliant portion of the pin member.

It should be noted that the magnet halves 94b, 94c could actually be two discrete permanent magnets, as is well known in the art. In such a case, the notch 96 would be replaced by spacing between the two discrete permanent magnets or by a comparable feature formed in the two discrete permanent magnets.

Figure 7:
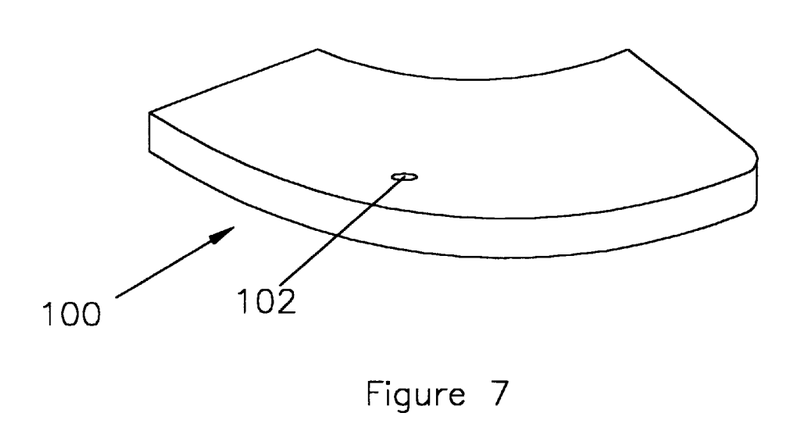
FIG. 7 is a perspective view of an upper pole piece for a voice coil motor of a disc drive actuator which has been modified in accordance with the present invention.

Turning now to FIG. 7, shown is an upper pole piece 100 for a VCM in a disc drive actuator. The upper pole piece 100 is made from steel, as was the lower pole piece 92 of FIG. 6, and may have a permanent magnet, such as that of FIG. 6, mounted to its lower surface, or, alternatively, may act by itself to provide a magnetic flux path for the permanent magnet attached to the lower pole piece. In either case, the upper pole piece 100 includes a through hole 102. This hole 102 is positioned and dimensioned to engage the shaft end (58 in FIGS. 3, 4 and 5) of the pin member that is mounted to the lower pole piece when the motor components are assembled into their intended relationship in the disc drive. Such engagement of the shaft end 58 of the pin member provides additional support and stability to the pin member when it is impacted as a limit stop, as will be discussed below.

It should also be noted that the tapped hole provided in the base member for engagement of the lower end of the pin member could also be a plain hole such as the hole 102 of FIG. 7. In such a case, the lower end of the pin member would also be a plain shaft segment intended for pressing or bonding into the hole in the base member.

Figure 8:
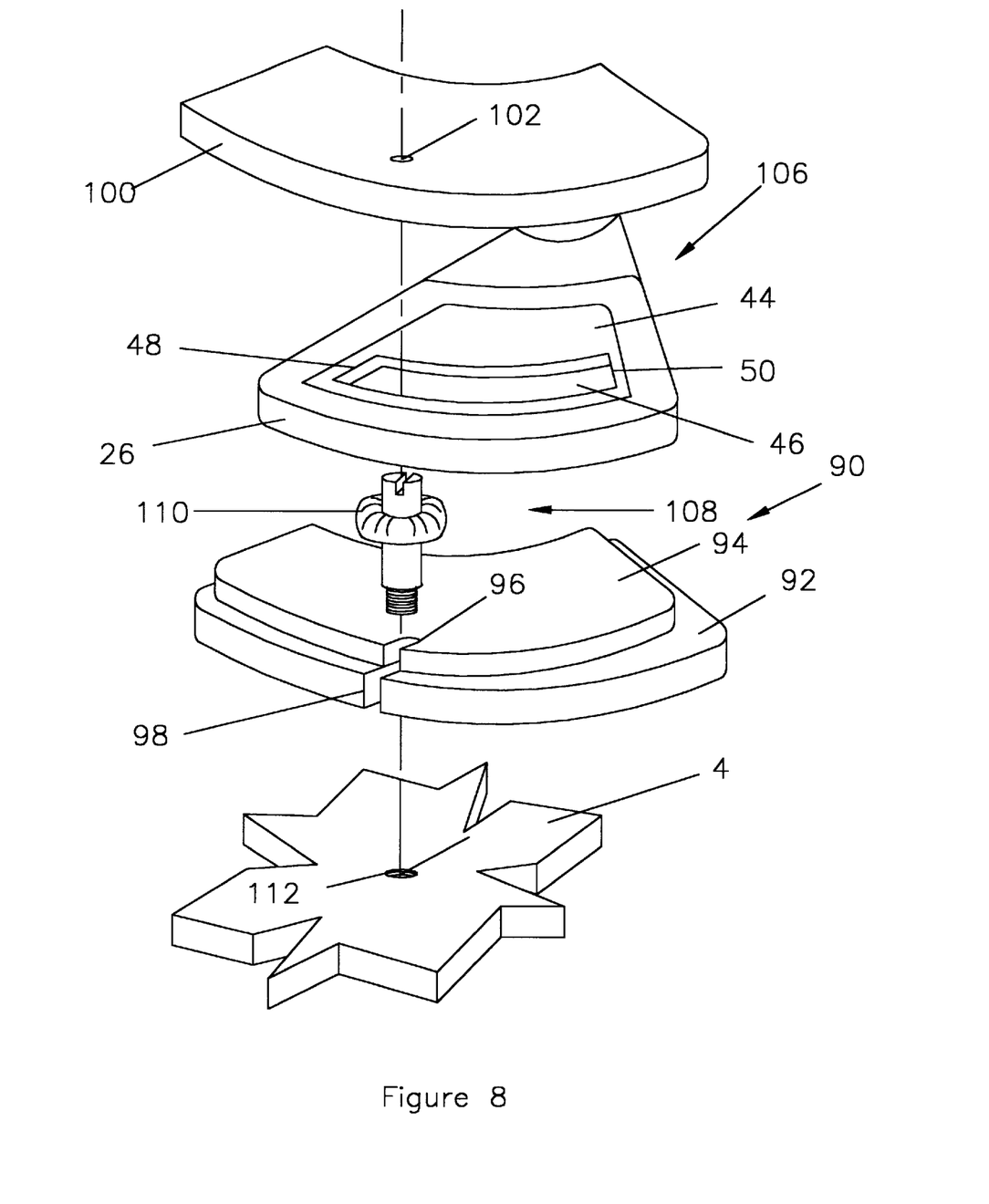
FIG. 8 is an exploded perspective view of the components of a disc drive actuator which has been modified in accordance with the present invention.

FIG. 8 is an exploded view of the pertinent components of a voice coil actuator for a disc drive and will be the reference for discussing the assembly of the various components previously described and their interaction to provide the limit stop system of the present invention.

In FIG. 8, a lower pole piece/permanent magnet assembly 90, such as that of FIG. 6, is shown. The lower pole piece/permanent magnet assembly 90 is mounted to the base member 4 of the disc drive housing using methods well known in the industry.

After the lower pole piece/permanent magnet assembly is mounted to the base member 4, the actuator body assembly 106 is mounted to the base member 4 using a threaded lower portion of the pivot shaft (22 in FIG. 1) and a corresponding tapped hole in the base member 4, or similar mounting method. Once the actuator body assembly 106 is secured to the base member 4, it is rotated clockwise to such an extent as to allow the disc stack and spindle motor components to be mounted to the base member 4.

After the disc stack and spindle motor components are installed to the base member, the actuator body assembly can be rotated counterclockwise until the heads achieve their intended relationship to the discs. This "head merge" operation is a well known step in the assembly of any disc drive.

Once the head merge has been accomplished, the coil 26 and the bobbin 44 on which the coil 26 is mounted will be supported by the actuator body assembly 106 in close proximity to the upper surface of the permanent magnet 94. In this position, the tapped hole 112 in the base member will be accessible through the elongated slot 46 in the bobbin 44 and the notches 96, 98 in the permanent magnet 94 and the lower pole piece 92. A pin member 108, such as one of those shown in FIGS. 3, 4 and 5, is then inserted through the elongated slot 46 in the bobbin 44 and screwed into engagement with the tapped hole 112 in the base plate 4.

Finally, an upper pole piece 100, such as that shown in FIG. 7, is assembled above the coil 26 with the hole 102 in the upper pole piece 100 engaging the shaft end 58 of the pin member.

Once these assembly steps have been accomplished, it will be appreciated that the pin member 108 is secured in a fixed position with its compliant portion 110, as noted above, lying within the extent of the elongated slot 46 in the bobbin 44 supporting the coil 26 of the VCM. With this arrangement of components, it is apparent that, when the actuator body assembly 106 is rotated counterclockwise about the pivot shaft 22, the inner contact surface 48 of the elongated slot 46 will engage the compliant portion 110 of the pin member 108, thus limiting the extent of inward motion of the heads on the discs.

Similarly, if the actuator body assembly 106 is rotated clockwise about the pivot shaft 22, the limit to motion in this direction will be established when the outer contact surface 50 of the elongated slot 46 contacts the compliant portion 110 of the pin member 108. Thus, a single pin member 108 serves as the limit stop for both directions of actuator travel.

A comparison of the limit stop system of the present invention with the prior art limit stop system described above in relationship to FIG. 1 reveals several advantages that the present invention provides over the prior art.

Firstly, the present invention requires that only a single pin member be assembled to the base member of the disc drive, rather than the two inner and outer limit stops 36, 38 of FIG. 1. This represents a reduction in parts count and an accompanying reduction in assembly labor.

Secondly, the prior art limit stop system of FIG. 1 requires that the contact features 40, 42 be added to the coil assembly during fabrication, adding not only complexity to the coil fabrication, but additional mass to the moving portion of the actuator. With the limit stop system of the present invention, by contrast, no additional components are added to the coil assembly. Indeed, the inclusion of the elongated slot 46 serves to reduce the moving mass of the actuator, and, as previously noted, requires no additional fabrication cost once the mold for the bobbin has been made.

Finally, the assembly of the limit stop system of the present invention requires no adjustment of component location as was the case in many prior art limit stop systems, thus simplifying assembly and further reducing manufacturing costs. The precision of the limit stop system of the present invention is solely dependent on component dimensional precision and the accuracy of the relative location of various tapped holes in the disc drive housing base member, and is, therefore, simple to maintain in a high volume manufacturing environment.

It will be apparent to one of skill in the art that the proper selection of the elastomeric materials in pin members such as those of FIGS. 3 and 4, along with selection of the radial dimension of these elastomeric materials, will allow the amount of compliance in the limit stop system of the present invention to be determined in accordance with the requirements of the disc drive design.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiment, certain variations and modifications may be suggested to one of skill in the art upon reading this disclosure. Therefore, the scope of the present invention should be considered to be limited only by the following claims.

What is claimed is:

1. A disc drive comprising:
   a rotary voice coil actuator
      having an axis of rotation,
      including a single flat coil lying substantially in a plane normal to the axis of rotation of the actuator, and
      having a range of motion;
   a generally planar bobbin lying in a plane substantially in the plane of the coil, the bobbin enclosed by the coil, the bobbin including an elongated slot perforating the bobbin and defined by interior surfaces within the bobbin, the interior surfaces normal to the plane of the bobbin, the slot having an inner contact surface and an outer contact surface;
   a pin fixedly mounted to a stationary portion of the disc drive and extending substantially parallel with the axis of rotation of the rotary voice coil actuator; and attached to the pin and positioned to engage the inner contact surface of the slot at a first time and to engage the outer contact surface of the slot at a second time, means for limiting the range of motion of the actuator.

2. In a disc drive including:

a generally planar bobbin;

a rotary voice coil actuator
 supported on said bobbin
 having an axis of rotation,
 including a single flat coil lying substantially in a plane coplanar with the bobbin and normal to the axis of rotation of the actuator, and
 having a range of motion; and engaging said bobbin, a limit stop system for defining extremes of and limiting said range of motion of said actuator, said limit stop system comprising:
 an elongated slot formed in said bobbin, the slot perforating the bobbin and defined by interior surfaces within the bobbin, the interior surfaces normal to the bobbin, said slot adapted for engaging an interior portion of the bobbin with a limit stop for defining extremes of said range of motion of said rotary voice coil actuator; and a pin member fixedly mounted to a stationary portion of said disc drive, attached to the limit stop, and extending substantially parallel with the axis of rotation of the rotary voice coil actuator;

the improvement comprising: attached to the pin, improved means for limiting the range of motion of the actuator.

3. A disc drive actuator stop apparatus comprising:

a bearing having an axis of rotation;

a flat coil bobbin mounted on said bearing, lying substantially in a plane perpendicular to said axis, and having a range of motion about said axis;

an elongated slot
 formed within said bobbin in an arc made by rotating the bobbin about said axis, and
 defined by interior surfaces within said bobbin; and fixedly mounted with respect to said bobbin, means for engaging said bobbin at said interior surfaces and for limiting the range of motion of said bobbin about said axis.

* * * * *